(12) United States Patent
Park et al.

(10) Patent No.: US 10,475,550 B2
(45) Date of Patent: Nov. 12, 2019

(54) HIGH-CONDUCTIVITY TWO-DIMENSIONAL POLYANILINE NANOSHEETS AND METHOD FOR FABRICATING THE SAME

(71) Applicant: POSTECH ACADEMY-INDUSTRY FOUNDATION, Pohang-si, Gyeongsangbuk-do (KR)

(72) Inventors: Moon Jeong Park, Pohang-si (KR); Il Young Choi, Pohang-si (KR); Joung Phil Lee, Bupyeong-gu (KR)

(73) Assignee: POSTECH ACADEMY-INDUSTRY FOUNDATION (KR)

( * ) Notice: Subject to any disclaimer, the term of this patent is extended or adjusted under 35 U.S.C. 154(b) by 0 days.

(21) Appl. No.: 15/998,982

(22) Filed: Aug. 20, 2018

(65) Prior Publication Data

US 2019/0066867 A1 Feb. 28, 2019

Related U.S. Application Data

(62) Division of application No. 15/130,911, filed on Apr. 15, 2016, now Pat. No. 10,561,167.

(30) Foreign Application Priority Data

Apr. 16, 2015 (KR) .................. 10-2015-0053859
Jul. 1, 2015 (KR) .................. 10-2015-0094331

(51) Int. Cl.
*B29C 33/52* (2006.01)
*H01B 1/12* (2006.01)
(Continued)

(52) U.S. Cl.
CPC ........... *H01B 1/128* (2013.01); *B29C 33/424* (2013.01); *B29C 33/52* (2013.01); *B29C 41/003* (2013.01);
(Continued)

(58) Field of Classification Search
CPC ....... H01B 1/128; B29C 33/424; B29C 41/12; C08G 73/0266; C09D 5/24; B29K 2079/00
See application file for complete search history.

(56) References Cited

U.S. PATENT DOCUMENTS

2008/0265215 A1* 10/2008 Wessling ............... B82Y 30/00
252/500

FOREIGN PATENT DOCUMENTS

CN 101633779 A 1/2010
CN 101633779 A1 * 1/2010

* cited by examiner

*Primary Examiner* — Eisa B Elhilo
(74) *Attorney, Agent, or Firm* — Steptoe & Johnson LLP

(57) ABSTRACT

The present invention relates to a conductive two-dimensional polyaniline (PANI) nanosheets template. The method comprises polymerizing aniline on an ice surface. The PANI nanosheets show distinctly high current flows of 5.5 mA at 1 V and a high electrical conductivity of 35 S/cm, which mark a significant improvement over previous values on other PANIs reported over the past decades. These improved electrical properties of the PANI nanosheets are attributed to the long-range ordered edge-on π-stacking of the quinoid ring, ascribed to the ice surface-assisted vertical growth of PANI. The PANI nanosheet can be easily transferred onto various types of substrates via float-off from the ice surfaces. In addition, PANI can be patterned into any shape using predetermined masks, and this is expected to facilitate the eventual convenient and inexpensive application of conducting polymers in versatile electronic device forms.

3 Claims, 8 Drawing Sheets

(51) Int. Cl.
*C09D 5/24* (2006.01)
*B29C 41/00* (2006.01)
*B29C 33/42* (2006.01)
*B29C 41/12* (2006.01)
*C08G 73/02* (2006.01)
*B29K 79/00* (2006.01)
*B29L 31/00* (2006.01)

(52) U.S. Cl.
CPC .......... *B29C 41/12* (2013.01); *C08G 73/0266* (2013.01); *C09D 5/24* (2013.01); *B29C 2033/525* (2013.01); *B29K 2079/00* (2013.01); *B29K 2909/00* (2013.01); *B29L 2031/7562* (2013.01)

[Fig. 2]
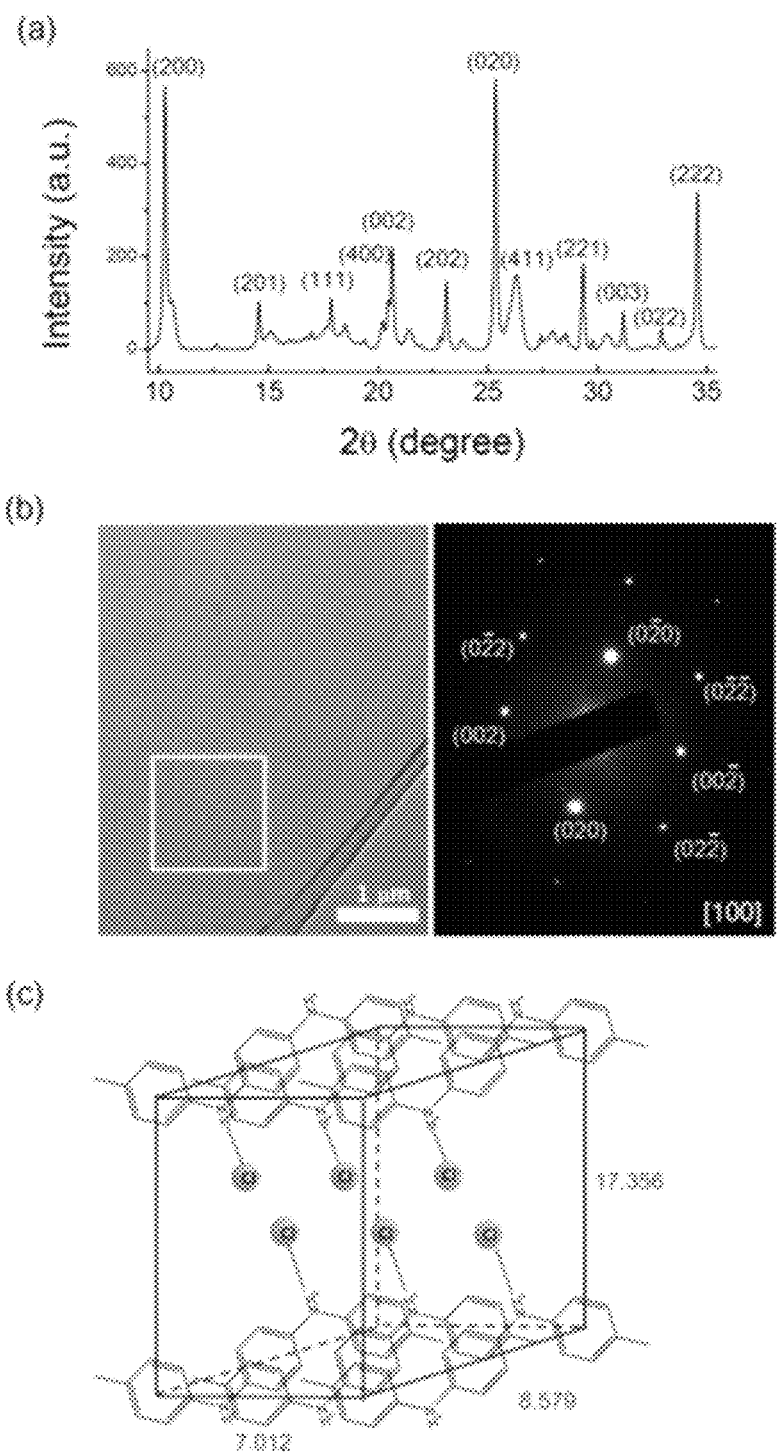

[Fig. 3]
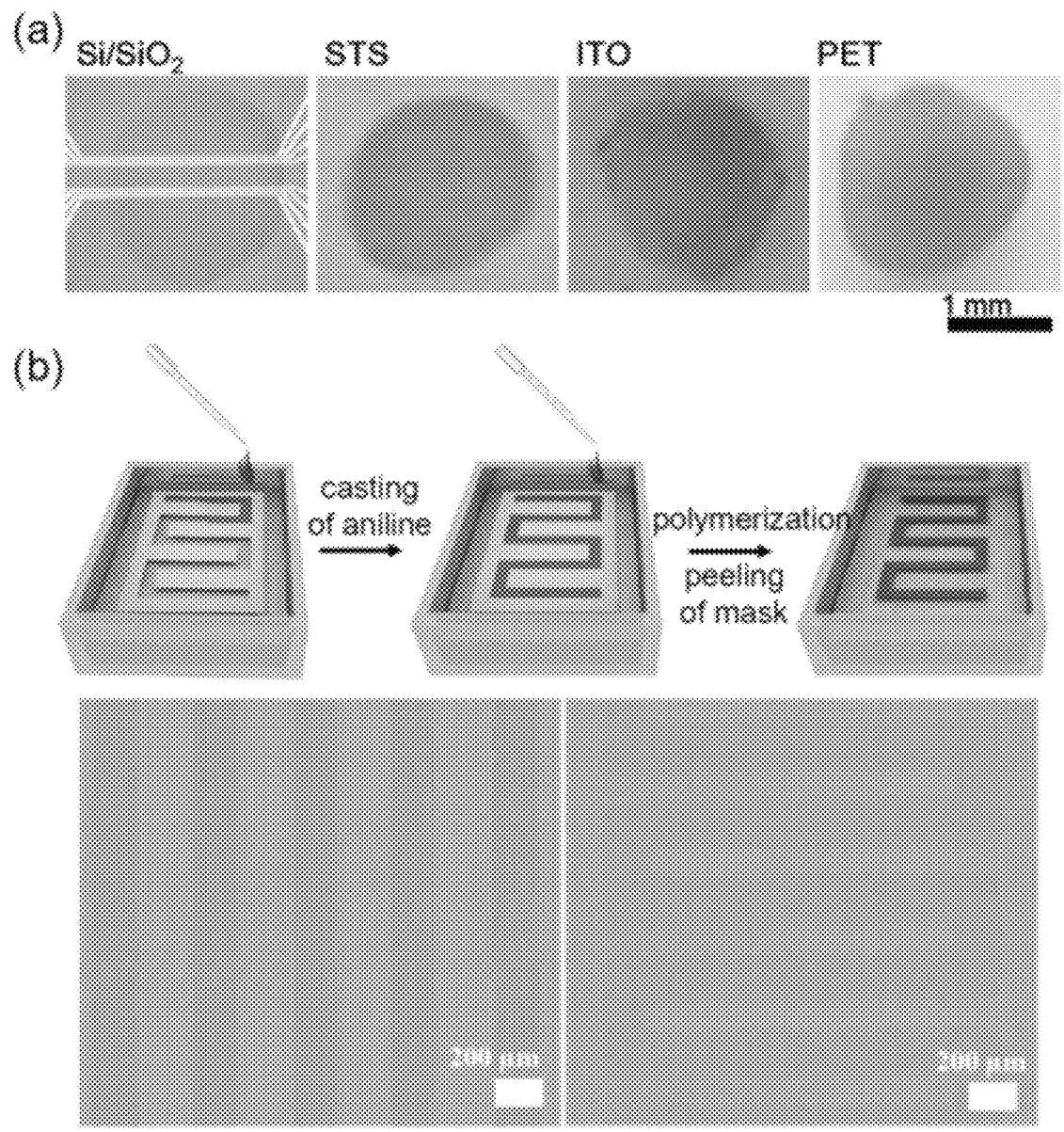

[Fig. 4]
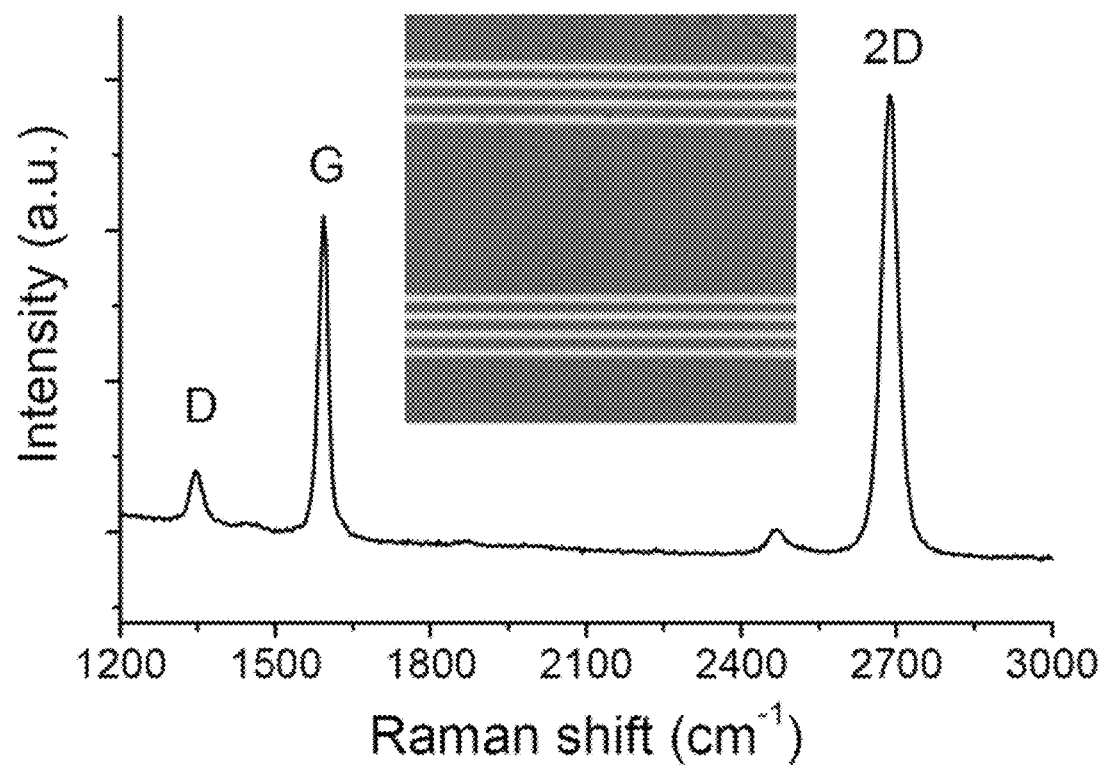

[Fig. 5]
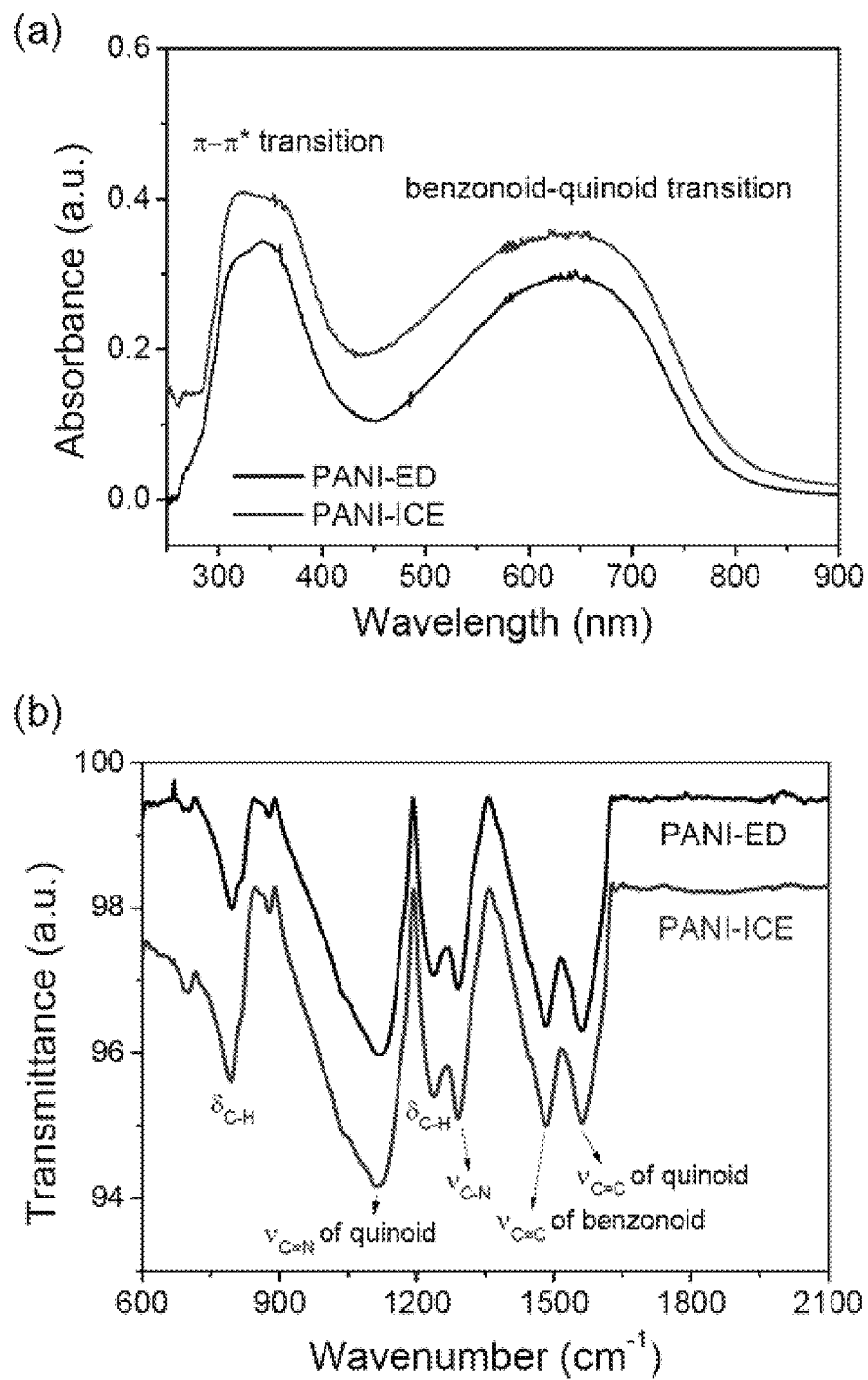

[Fig. 6]
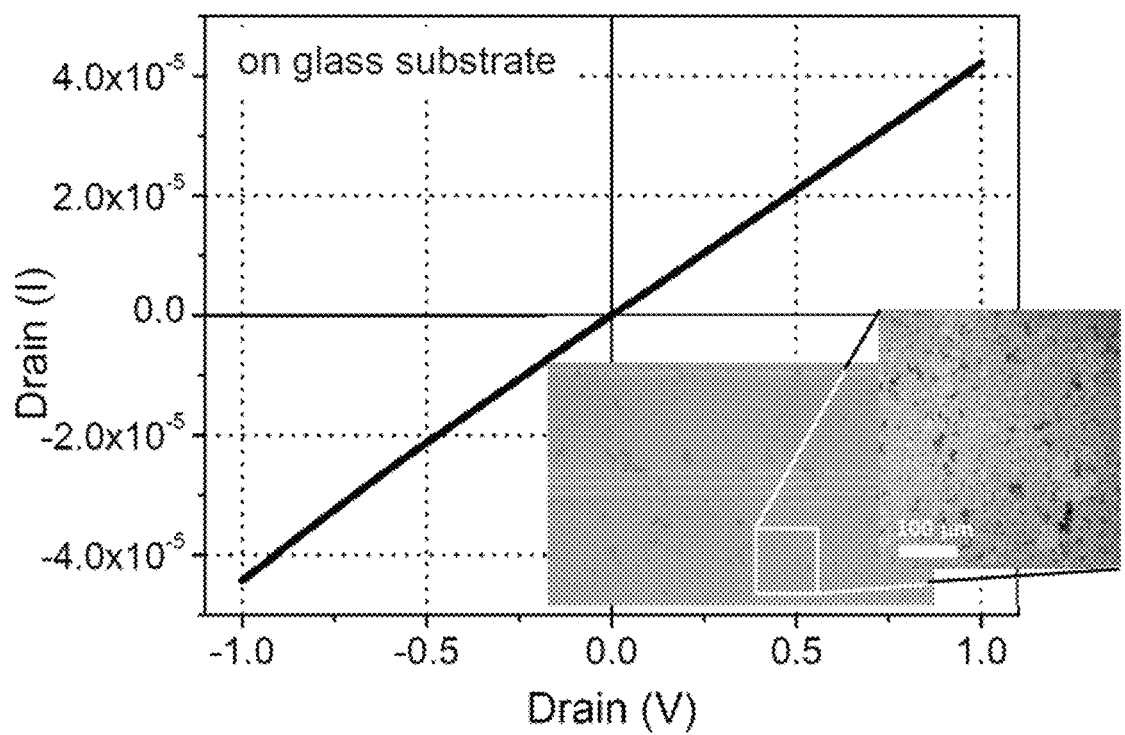

[Fig. 7]
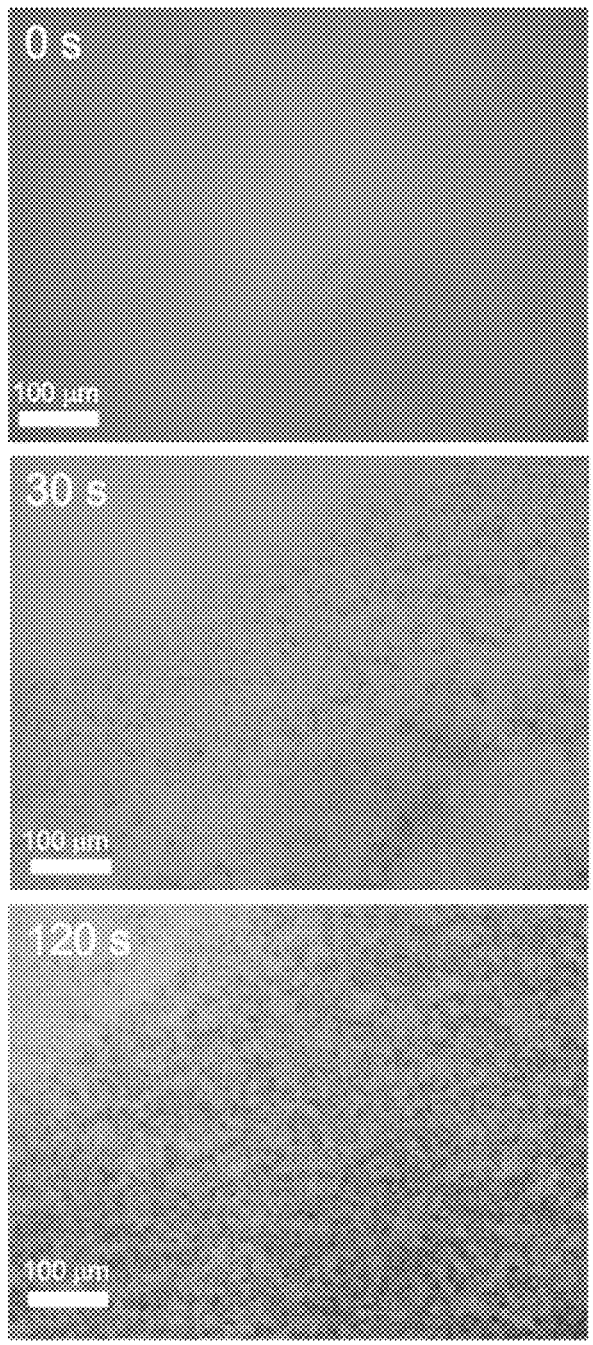

[Fig. 8]
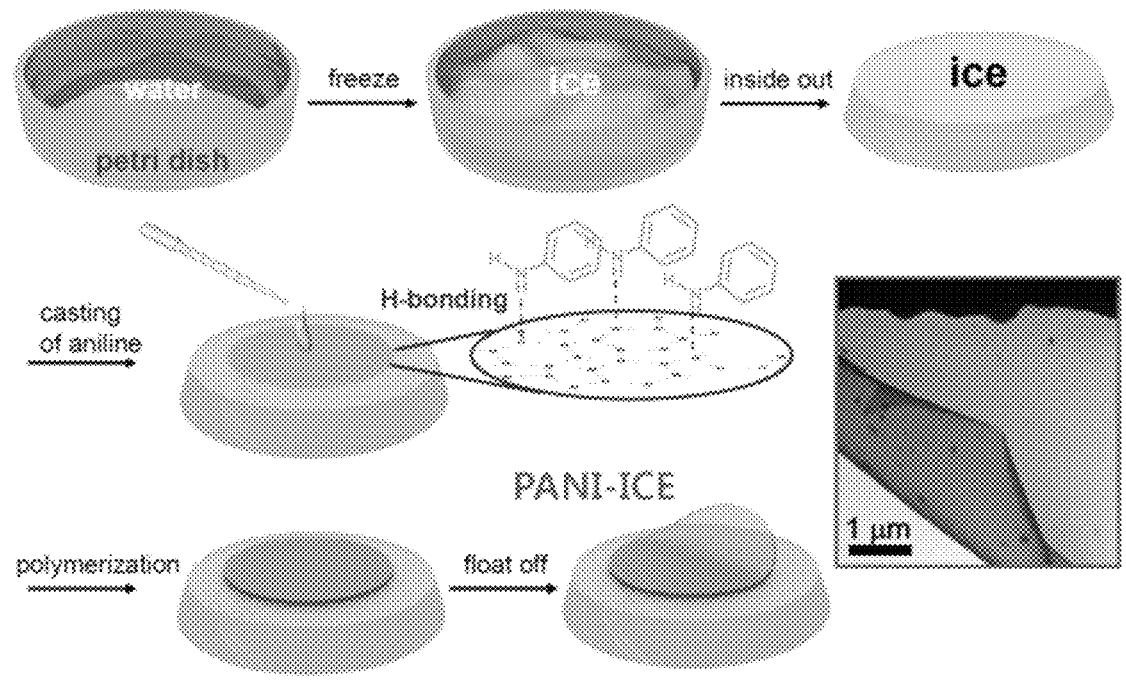

HIGH-CONDUCTIVITY TWO-DIMENSIONAL POLYANILINE NANOSHEETS AND METHOD FOR FABRICATING THE SAME

CLAIM OF PRIORITY

This application is a divisional application of U.S. application Ser. No. 15/130,911, filed on Apr. 15, 2016, now U.S. Pat. No. 10,056,167, which claims priority to Korean Application No. 10-2015-0053859, filed Apr. 16, 2015, and Korean Application 10-2015-0094331, filed Jul. 1, 2015, each of which is incorporated by reference in its entirety.

BACKGROUND OF THE INVENTION

Field of the Invention

The present invention relates to polyaniline nanosheets and a method for fabricating the same, and more particularly, to a method of fabricating high-conductivity polyaniline nanosheets on ice surfaces.

Description of the Prior Art

Since the discovery of conducting polymers in the mid-19th century, considerable efforts have been devoted, particularly over the past few decades, on their practical applications in a range of electronic devices, such as thin-film transistors, light emitting diodes, solar cells, batteries, and supercapacitors. In particular, many researchers have conducted studies on new synthesis methods capable of improving the electrical conductivity and processability of such conducting polymers. Examples of conducting polymers whose synthesis methods are currently known include polyaniline (PANI), polypyrrole (PPy), poly(p-phenylene vinylene) (PPV), and poly(thiophene) (PT) derivatives.

Among a variety of conducting polymers, PANI has long been considered a promising candidate for microelectronics and battery electrodes because of its high electrical conductivity, facile wet chemical synthesis at low cost, easy doping process, and very high stability. PANI in the emeraldine salt form has a high electrical conductivity ranging from $10^{-3}$ to $10^2$ S/cm with varying conjugation length, doping level, and the type of dopant. Decades of research on PANI have further revealed that the electrical properties of PANI can be largely tailored by changing the dimensionality of PANI nanostructures.

As an efficient method for synthesis of synthesize different PANI nanostructures, templated synthesis has widely been employed, which can be classified as follows: 1) synthesis using structured hard templates to direct the growth of aniline; and 2) a soft template route via oxidative polymerization of aniline. Through two such templated synthesis methods, various PANI structures such as nanoparticles, nanotubes, nanofibers, nanowires, nanosheets, and networks have been prepared by employing hard and soft templates that have stimulated investigations of the structure-property relationship of PANI. The results of such investigations emphasized the importance of developing two-dimensional (2D) structures to achieve enhanced electrical properties, especially in desired directions, to realize their applications in high-density integrated electrical devices and electronic devices.

Successful fabrication of 2D PANI nanostructures previously reported have mostly relied on the use of graphene oxide (GO) as a hard template because of its 2D nature in terms of atomic thickness and high surface area. In particular, the oxygen functional groups in GO serve as active sites capable of hydrogen bonding with aniline to facilitate two-dimensional (2D) growth of aniline along basal plane of GO via Π-Π stacking interactions. This results in the so-called "PANI/GO composite nanosheets", which show high electrical conductivity and mechanical strength. However, GO is likely to yield an inhomogeneous distribution of PANI and irreversible agglomerates, causing difficulty in obtaining reliable electrical properties over a large area. In addition, high costs, complicated synthetic procedures, and difficulty in removal of the GO template are also fundamental shortcomings of the PANI/GO composites.

SUMMARY OF THE INVENTION

It is an object of the present invention to provide a novel method capable of synthesizing pure and uniform PANI nanostructures over a large area in order to use PANI in next-generation electronic devices.

Another object of the present invention is to provide a method capable of controlling the properties of the surfaces and interfaces at which synthesis occurs, so as to enable pure and uniform PANI nanostructures to be synthesized over a large area.

To achieve the above objects, in one aspect, the present invention provides a method for fabricating a high-conductivity polyaniline nanosheet, comprising polymerizing aniline on an ice surface.

In the present invention, the aniline may be provided in a liquid form to the ice surface by dropping, casting or coating.

In the present invention, the polymerization may be chemical oxidative polymerization.

In the present invention, the polymerization is preferably performed at a temperature of 0° C. or lower.

In the present invention, the polymerization may be performed for 30 minutes or less, preferably 20 minutes or less, most preferably 20 minutes or less.

In the present invention, the method may further comprise melting the ice to separate the polymerized aniline.

In the present invention, the ice is preferably smooth ice.

In the present invention, the nanosheet has a thickness of 100 nm or less, preferably 50 nm or less, more preferably 10-40 nm, most preferably 30 nm.

In another aspect, the present invention provides a method for fabricating a high-conductivity polyaniline nanopattern, comprising: forming a predetermined pattern on an ice surface; and polymerizing aniline on the ice surface, thereby fabricating a polyaniline nanosheet according to the predetermined pattern.

In still another aspect, the present invention provides a highly conductive crystalline nanosheet having an orthorhombic structure in which quinoid rings are arranged in a substantially vertical direction and which has an edge-on Π-Π stacking of conjugated rings.

In the present invention, the highly conductive crystalline nanosheet comprises an emeraldine salt.

In the present invention, the highly conductive crystalline nanosheet has an electrical conductivity of at least 10 S/cm, preferably at least 20 S/cm, more preferably at least 30 S/cm, for example, 35 S/cm.

In yet another aspect, the present invention provides a composite comprising: an ice substrate; and a high-conductivity polyaniline nanosheet formed on the ice substrate. The electrically conductive polyaniline nanosheet may be a patterned nanosheet.

BRIEF DESCRIPTION OF THE DRAWINGS

FIGS. 2(a)-2(c) show the structural characteristics of PANI-ICE determined by combining (a) X-ray powder diffraction and (b) selected-area electron diffraction, which indicate highly crystalline PANI-ICE with an orthorhombic structure, as indexed in (a) and (b). FIG. 2(c) is a representation of the determined orthorhombic structure with an edge-on Π-Π stacking of conjugated rings for PANI-ICE.

FIG. 3(a) shows photographs of PANI-ICE transferred onto different substrates as noted by float-off from ice surfaces. FIG. 3(b) shows optical micrographs of micropatterned PANI-ICE into parallel lines and periodic lines with 90° bends using metal masks.

FIG. 4 shows the confocal Raman spectrum of graphene synthesized using a CVD process. D-band, G-band and 2D band of graphene correspond to 1350, 1580 and 2700 cm$^{-1}$, respectively, as indicated in the figure.

FIGS. 5(a) and 5(b) show the UV-Vis spectra (a) and Fourier transform infrared (FT-IR) spectra (b) of PANI-ICE and PANI-ED. PANI-ICE and PANI-ED are all present as emeraldine salts having similar doping levels.

FIG. 6 depicts the I-V characteristic curve of a PANI nanosheet synthesized on a glass substrate. The inset in FIG. 6 is an optical micrograph of the PANI nanosheet synthesized on the glass substrate.

FIG. 7 depicts in situ micrographs of a PANI nanosheet synthesized on a glass substrate at 0° C.

FIG. 8 illustrates synthetic procedures for 2D PANI nanosheets on ice surfaces (PANI-ICE). Inset: TEM micrograph confirming the formation of 2D nanosheet with few defects.

DETAILED DESCRIPTION OF THE INVENTION

FIG. 8 depicts synthetic procedures for 2D PANI nanosheets on ice surfaces (hereinafter referred to as PANI-ICE). First, aniline solution in 1M HCl is cast on the ice frozen in a Petri dish, which provides a smooth surface after turning it upside down. Protonated anilinium can be readily adsorbed on the dangling OH groups on the ice surfaces by hydrogen bonding and electrostatic interactions. Ammonium peroxydisulfate solution in 1M HCl is then immediately added dropwise to the ice with the aniline deposit to allow chemical oxidation of aniline monomers while the reaction temperature is kept stable at Or. Upon oxidative polymerization for 3 minutes, the formation of PANI-ICE that is a few millimeters in diameter becomes apparent to the naked eye. The thickness of PANI-ICE was ca. 30 nm, as measured by a scanning probe microscope after transferring the sample onto a Si/SiO$_2$ substrate. The formation of 2D nanosheets with few defects was confirmed by transmission electron microscopy (TEM), as shown in the inset of FIG. 8. Considering the fact that most reports on chemical oxidative polymerization of PANI have 0D or 1D PANI morphologies that are ascribed to surface-induced aggregation, the facile fabrication of a 2D PANI nanostructure simply by introducing ice templates is noteworthy.

Figure 1:
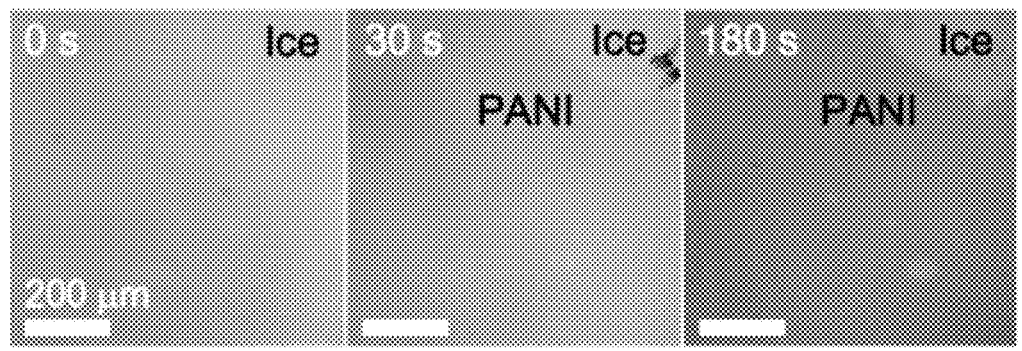
FIG. 1(a) depicts in situ imaging of the synthesis of PANI on ice surfaces, where photographs were taken during the middle of the reaction, as noted in the figure.
FIG. 1(b) of PANI-ICE, compared to those of PANI-ED and graphene-CVD. The inset in FIG. 1(b) is an optical micrograph of PANI-ICE on gold electrodes.
Figure 1:
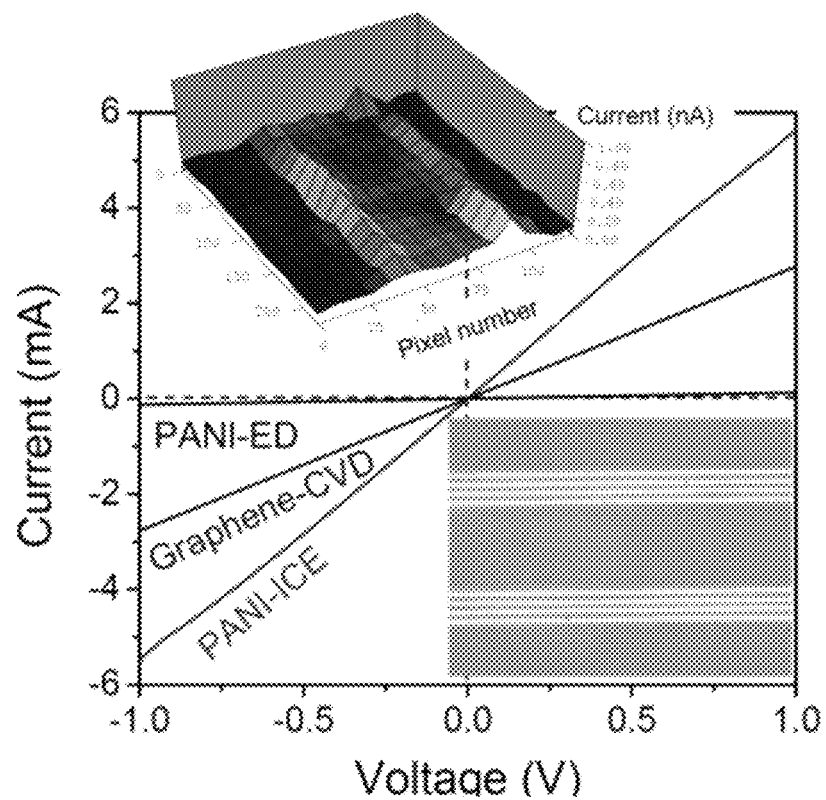

To study the synthesis mechanisms of PANI-ICE, PANI on the ice surface was monitored in situ using an optical microscope equipped with cryogenic sample stages. Photographs of PANI-ICE intermediates taken during the middle of the reaction are shown in FIG. 1a. The present inventors see the intriguing appearance of a uniform layer of aniline with a diameter of several millimeters in the early stage of the reaction (<30 seconds), ascribed to the readily adsorbed nuclei or oligomers via hydrogen bonding interaction. The lower potential energy of ice at the PANI/ice interfaces compared to that of bulk water should also play a key role in developing a large-area wetting layer of aniline by reducing nucleation barrier. As the oxidation reaction proceeds, no significant change in the size of nanosheets was noticed, but preferential vertical growth of PANI was perceived through the increasingly dark blue color, eventually yielding uniform large-area PANI nanosheets within 3 min of the reaction. The present inventors first investigated the electrical properties of PANI-ICE by measuring current-voltage (I-V) characteristics by sweeping voltages between −1.0 and 1.0V at constant temperature and humidity conditions (25° C. and 20%). FIG. 1b shows representative I-V curves of PANI-ICE compared to that of conventional PANI thin films prepared by galvanostatic electrochemical deposition method (referred to as PANI-ED), measured using gold electrodes (10 mm wide and 10 mm apart) on Si/SiO2 substrates (see inset photograph showing PANI-ICE placed on top of the gold electrodes). Interestingly, a distinctly high current flow of 5.5 mA at 1 V was obtained for PANI-ICE with linear I-V characteristics, contrary to a low current flow of 0.12 mA for PANI-ED. The uniformity of PANI-ICE in the entire area was further confirmed by a spatially resolved photocurrent imaging technique using a focused laser beam with a 500 nm diameter and a 532 nm wavelength under 0.1V bias. A representative result acquired over an area of 30×30 mm is given in the inset.

By taking into account the size and thickness of each sample, the electrical conductivities of PANI-ICE and PANIED were calculated using the equation:

$$\sigma = \frac{L \cdot I}{V \cdot A}$$

where L is the distance between gold electrodes (10 mm), I is the electric current, V is the applied voltage, and A is the cross-sectional area of the sample. Notably, the electrical conductivity of PANI-ICE was determined to be 35 S/cm, which is two orders of magnitude higher than that of PANI-ED (0.8 S/cm). To the best of knowledge of the present inventors, the present inventors report the highest electrical conductivity for PANI as compared to the values of any other PANIs reported in the literature (by focusing on the use of HCl as the most common dopant), which are typically around 1 S/cm, analogous to that of PANI-ED in the present invention. This clearly indicates the impact of the results of the present invention on the structure of conducting polymers based on PANI. The I-V curve of graphene synthesized by chemical vapor deposition (graphene-CVD, sheet resistance of about 360 ohm/sq; Raman spectrum is given in FIG. 4) is also shown in FIG. 1b as a benchmark material, suggesting that PANI-ICE of the present invention can serve as a new electrical soft material with superior electrical properties. The additional benefits of fast and large-area synthesis at low cost for PANI-ICE of the present invention are worth noting.

Because it is well-known that the key parameters affecting electrical conductivities of conducting polymers are conjugation length and doping level, molecular characteristics of PANI-ICE were examined in comparison with those of PANI-ED. As can be seen in FIGS. 5(a) and 5(b), from the UV/Vis and IR absorption spectra, essentially the same conjugation length and doping level were identified for PANI-ICE and PANI-ED. Thus, the present inventors thus deduce that the improvement in the electrical conductivity of PANI-ICE did not originate from chemical factors.

Mechanisms underlying the improved electrical properties could be ascribed to the intriguing molecular orientation and high crystallinity of PANI-ICE. The structural characteristics of PANI-ICE were studied using X-ray powder diffraction (XRD) and selected area electron diffraction (SAED) in TEM. The XRD profile indicates that aniline molecules assembled in PANI-ICE have a long-range order with an orthorhombic P222 space group, as indexed in FIG. 2a, with the unit cell parameters of a=17.356 Å, b=7.012 c=8.579 Å, and $\alpha=\beta=\gamma$ 90.00°. It is thus inferred that PANI molecules are Π-Π stacked along the b-axis with a d spacing of about 3.51 Å and the PANI main chains are periodically positioned with a d spacing of about 4.29 Å along the d-axis. From SAED, the quinoid rings in PANI-ICE are predominantly found to be tiled in the vertical direction over the entire area examined. A representative result is given in FIG. 2b, where the brightest (020) reflection of PANI-ICE indicates an edge-on Π-Π stacking of conjugated rings, as illustrated in FIG. 2c.

This implies that the ice surface influences the packing properties of aniline molecules in developing long-range ordered 2D nanostructures, intimately associated with the improved electrical conductivity. To further support the hypothesis of the present inventors, the present inventors have synthesized 2D PANI nanosheets on different OH-containing substrates (Si-wafer and glass) under the same synthetic conditions. Interestingly, the resulting PANI nanosheets appeared to be very defective and porous, leading to a current flow that is a few orders of magnitude lower (see I-V curve and optical images of PANI synthesized on glass substrate in FIG. 6). This is due to the formation of heterogeneous nuclei and aggregation under the low temperature conditions, consistent with previous reports, but the same analogy could not be found in PANI-ICE. It should be noted that when the synthesis of PANI on glass was monitored in situ (FIG. 7), nucleation of PANI with an average size of a few micrometers was readily detected in the early stages of the reaction, followed by the common nucleation and growth mechanisms to coalesce into large PANI aggregates with time. This clearly indicates the importance of ice surfaces with the layer of quasi-ordered water molecules in forming uniform and large-area 2D PANI nanosheets.

The unprecedented advantages of PANI-ICE compared to other reported conducting polymers are as follows. First of all, on account of easy removal of the ice-template, PANI-ICE is transferable onto any kind of substrate such as metals, indium tin oxide (ITO), Si-wafer, glass, and even polymer substrates, which have not been reported previously. The photographs of PANI-ICE on different substrates are given in FIG. 3a. Furthermore, micropatterned PANI can be easily prepared using micropatterned masks. As representative examples, optical micrographs of patterned PANI-ICE into parallel lines and periodic lines with 90° bends are shown in FIG. 3b. In principle, it can be patterned into any shape with predetermined masks, suggesting new avenues towards future organic electronics technologies.

In summary, the facile synthesis of highly conducting 2D PANI nanosheets by chemical oxidative polymerization was investigated in the present invention. The ice-templated PANI nanosheet demonstrated electrical conductivity that was a few orders of magnitude higher than that of most HCl-doped PANIs reported to date. This is ascribed to the unique advantage of ice surfaces, offering low potential energy and quasi-ordered dangling OH groups. To the best of knowledge of the present inventors, the present invention demonstrates the first example of patternable, transferable, and pure 2D conducting polymers with advanced electrical properties.

Experimental Section

PANI-ICE was synthesized by chemical oxidative polymerization on ice surfaces at 0° C. using aniline (>99.5%, Sigma-Aldrich) and ammonium peroxydisulfate (APS) (>98.0%, Alfa Aesar). Water was frozen at −20° C. in a Petri dish, which was flipped over for the synthesis to provide a smooth surface. Aniline (0.25M in 1M HCl) and APS (0.25M in 1M HCl) were added to the ice such that the molar ratio of aniline to APS was 8:3. After 3 minutes of reaction, the formation of 2D nanosheets with a diameter of a few millimeters was apparent to the naked eye. After transferring PANI-ICE onto the Si-wafer via float-off from the ice surface, the PANI-ICE was washed repeatedly with deionized water and dried in a vacuum oven for about one week.

The morphology and molecular orientation of PANI-ICE were analyzed by transmission electron microscopy (JEOL-JEM-2100F) equipped with selected area electron diffraction (SAED). The crystal structure of PANI was characterized by powder X-ray diffraction (XRD). The diffraction data on the crystal structure were collected in a 2D beamline at the Pohang Accelerator Laboratory using synchrotron radiation. In situ monitoring of the synthesis of PANI-ICE was performed using an optical microscope (RMC Ultramicrotome) under cryogenic conditions.

I-V characteristic curves of PANI-ICE and PANI-ED were measured using a semiconductor analyzer at room temperature and RH=20%. Data were collected over a voltage ranging from −1.0 to 1.0V using the linear sweep mode. Spatially resolved photocurrents were acquired using a focused laser beam of 500 nm in diameter at a 532 nm wavelength under a 0.1 V bias.

Synthesis of PANI-ICE and PANI-ED

PANI-ICE was synthesized by chemical oxidative polymerization on ice surfaces at 0° C. using aniline (>99.5%, Sigma-Aldrich) and ammonium peroxydisulfate (APS) (>98.0%, Alfa Aesar). Water was frozen at −20° C. in a Petri dish, which was flipped over for the synthesis to provide a smooth surface. Aniline (0.25M in 1M HCl) and APS (0.25M in 1M HCl) were added to the ice such that the molar ratio of aniline to APS was 8:3. After 3 minutes of reaction, the formation of 2D nanosheets with a diameter of a few millimeters was apparent to the naked eye. After transferring PANI-ICE onto the Si-wafer via float-off from the ice surface, the PANI-ICE was washed repeatedly with deionized water and dried in a vacuum oven for about one week. For a control experiment, synthesis of PANI-ED having a thickness of 30 nm was performed according to a conventional electrochemical deposition method using three electrodes at a constant voltage of 1.5 V. As the reference electrode, a silver/silver chloride (saturated potassium chloride solution) was used, and as the working electrode and the counter electrode, strongly doped silicon wafers were used (<0.005 ohm). As the electrolyte solution, a solution of 0.25 M aniline in 1M hydrochloric acid was used. After reaction, the produced PANI-ICE was washed repeatedly with deionized water and dried in a vacuum oven for about one week.

Analysis of Characteristics of Molecules and Nanosheet Structures

The characteristics of PANI-ICE and PANI-ED molecules were analyzed using an UV-Vis spectrometer (Agilent 8453) and a Fourier transform spectrometer (Two IR spectrometer, PerkinElmer). The morphology and molecular orientation of PANI-ICE was analyzed by transmission electron microscopy (JEOL-JEM-2100F) equipped with selected area electron diffraction (SAED). The crystal structure of PANI was characterized by powder X-ray diffraction (XRD). The diffraction data on the crystal structure were collected in a 2D beamline at the Pohang Accelerator Laboratory. The unit lattice structure of PANI could be determined through crystalmaker simulation. In situ monitoring of the synthesis of PANI-ICE was performed using an optical microscope under cryogenic conditions.

Electrical Analysis

I-V characteristic curves of PANI-ICE and PANI-ED were measured using a semiconductor analyzer at room temperature and RH=20%. Data were collected over a voltage ranging from −1.0 to 1.0V using the linear sweep mode. Spatially resolved photocurrents were acquired using a focused laser beam of 500 nm in diameter at a 532 nm wavelength under a 0.1 V bias.

Preparation of Micropatterned PANI-ICE

Micropatterned PANI was prepared using a metal mask having a predetermined size and shape. The mask was placed on an ice surface, and then chemical oxidative polymerization was performed at 0° C., like the method for synthesizing PANI-ICE. The micropatterned PANI-ICEs were observed using an optical microscope (ZEISS Axio scope A1).

The confocal Raman spectrum of graphene synthesized using chemical vapor deposition was measured using a WITEC Alpha 300R Raman spectroscope (WITec, Ulm, Germany) equipped with a HeNe laser. The spatial resolution of the spectroscope is 250 nm. Three peaks (1350, 1580, and 2700 cm$^{-1}$) in the figure correspond to D-band, G-band, and 2D-band, respectively, suggesting that the synthesized graphene has a few defects/disorders. The inset is a photograph of graphene-CVD placed on a gold electrode, and the current-voltage characteristic data of the graphene are shown in FIG. 1b.

The UV-Vis spectra and Fourier transform infrared spectra of PANI-ICE and PANI-ED were measured at room temperature. As shown in FIG. 5(a), similar absorption spectra could be obtained for the two materials. IR absorption spectra associated with benzenoid-quinoid transition were analyzed as shown in FIG. 5, and as a result, similar intensity ratios (about 0.98±0.02) could be obtained for the two materials, indicating that PANI-ICE and PANI-ED are all present as emeraldine salts having similar doping levels.

In the present invention, the electrical characteristics of PANI nanosheets synthesized on different OH-containing substrates were analyzed by measuring the current-voltage characteristics of the PANI nanosheets at room temperature and a voltage ranging from −1.0 V to 1.0 V using the linear sweep mode. FIG. 6 shows the current-voltage curve of a PANI nanosheet synthesized on a glass substrate at 0° C. Interestingly, the synthesized PANI nanosheets appeared to be very defective and porous, leading to a current flow that is a few orders of magnitude lower (see the optical micrograph in the inset). The electrical conductivity value calculated from the measured results was very low (0.07 S/cm).

The synthesis of PANI on a glass substrate at 0° C. was monitored in situ. As can be seen in FIG. 7, nucleation of PANI with a size of a few micrometers was detected in the early stages of the reaction, followed by the common nucleation and growth mechanisms to coalesce into large PANI aggregates with time. This clearly indicates the importance of ice surfaces with the layer of quasi-ordered water molecules in forming uniform and large-area 2D PANI nanosheets.

What is claimed is:

1. A highly conductive crystalline nanosheet having an orthorhombic structure in which quinoid rings are arranged in a vertical direction and which has an edge-on π-π stacking of conjugated rings.

2. The highly conductive crystalline nanosheet of claim 1, which is one doped with an emeraldine salt.

3. The highly conductive crystalline nanosheet of claim 1, which has an electrical conductivity of 10 S/cm or higher.

* * * * *